(12) United States Patent
Tokano

(10) Patent No.: US 7,345,697 B2
(45) Date of Patent: Mar. 18, 2008

(54) HOUSING APPARATUS OF CAMERA HAVING REMOVABLE DIFFUSION PORTION

(75) Inventor: Kaneyoshi Tokano, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 720 days.

(21) Appl. No.: 10/360,118

(22) Filed: Feb. 7, 2003

(65) Prior Publication Data

US 2003/0151691 A1    Aug. 14, 2003

(30) Foreign Application Priority Data

Feb. 14, 2002    (JP)    ............................. 2002-036810

(51) Int. Cl.
    *H04N 9/47*    (2006.01)
(52) U.S. Cl. ........................................ 348/81; 348/370
(58) Field of Classification Search ................... 348/81
    See application file for complete search history.

(56) References Cited

U.S. PATENT DOCUMENTS 5,329,327 A * 7/1994 Arai et al. .................. 396/177

6,476,853 B1 * 11/2002 Zernov et al. ................ 348/81
2002/0090212 A1 * 7/2002 Shimamura et al. .......... 396/27
2006/0008261 A1 * 1/2006 Watanabe et al. ............. 396/25

FOREIGN PATENT DOCUMENTS

| CN | 2047396 U | 11/1989 |
| CN | 2060235 U | 8/1990 |
| JP | 51-029133 | 3/1976 |
| JP | 53-038332 | 4/1978 |
| JP | 53-038332 U | * 4/1978 |
| JP | 11-231394 | 8/1999 |
| JP | 2001-333814 | 12/2001 |

* cited by examiner

*Primary Examiner*—Lin Ye
*Assistant Examiner*—Dillon Durnford-Geszvain
(74) *Attorney, Agent, or Firm*—Cowan, Liebowitz & Latman, P.C.

(57) ABSTRACT

A housing apparatus for receiving an image pickup device provided with a light projecting portion for projecting light is provided. The housing apparatus includes a receiving portion for receiving a diffusion plate for diffusing light from the light projecting portion. The receiving portion discloses a housing apparatus, such as a water-proof case, to which the diffusion plate is detachably attachable.

4 Claims, 7 Drawing Sheets

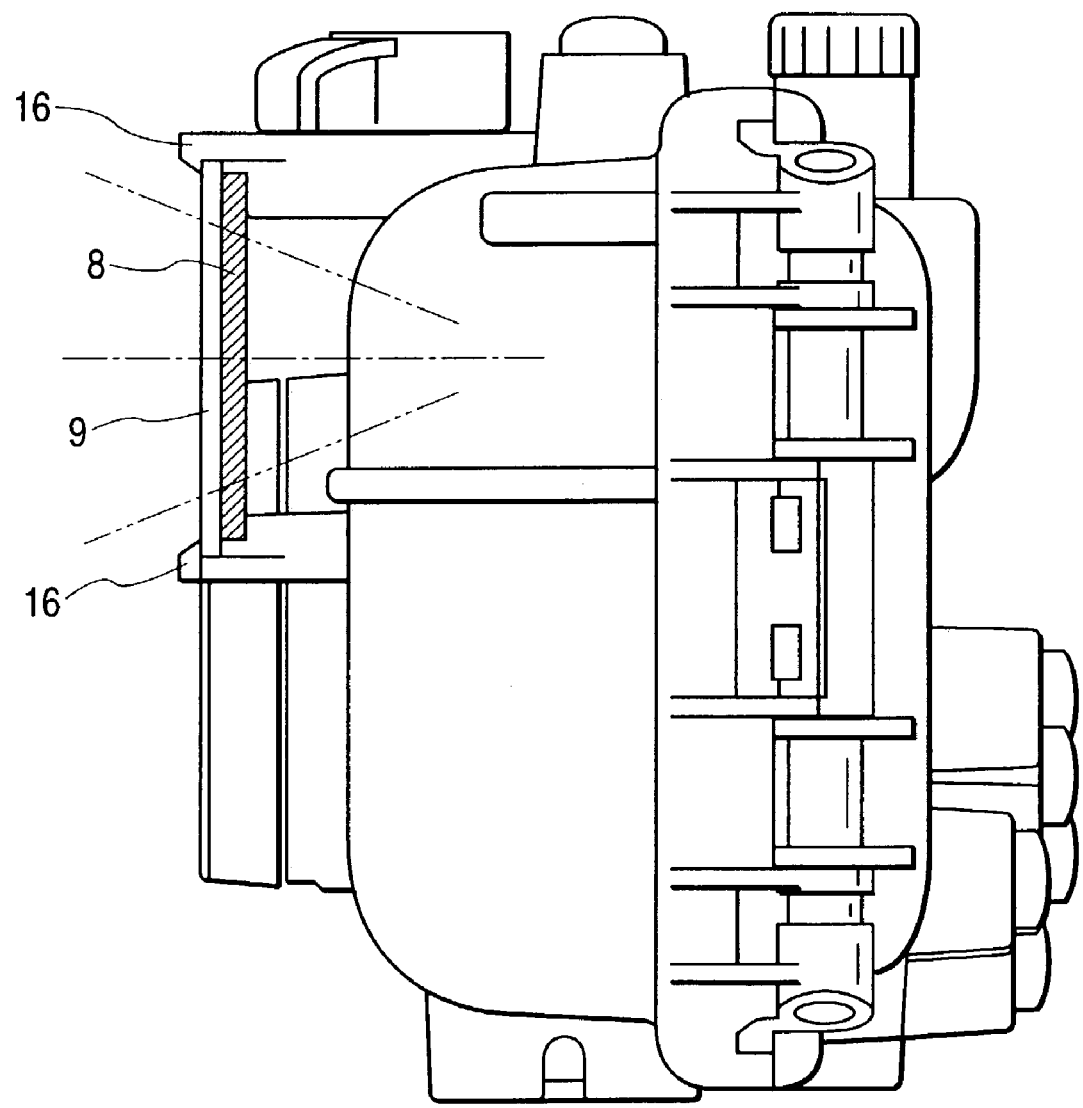

HOUSING APPARATUS OF CAMERA HAVING REMOVABLE DIFFUSION PORTION

BACKGROUND OF THE INVENTION

1. Field of the Invention

The present invention relates to a housing apparatus that receives an image pickup device.

2. Related Background Art

Up to now, various types of water-proof/dust-proof housings have been proposed. FIG. 5 shows a conventional water-proof/dust-proof housing that is provided with a water-proof/dust-proof function by storing and sealing up therein a digital camera, which is described simply here. Note that the digital camera is stored in the housing in FIG. 5 although not shown in the figure.

In the figure, reference numeral 1 denotes a front shell, which covers a front surface of the digital camera. Reference numeral 2 denotes a rear shell, which covers a rear surface of the digital camera. Reference numeral 3 denotes a buckle, which connects the front shell and the rear shell, and reference numeral 4 indicates a member, which fixes both the shells in a state in which a space sealed up therein is maintained. The above three components constitute a basic structure of the water-proof/dust-proof housing.

Reference numeral 4 denotes a shell supporting shaft, which is the center of a relative rotational movement of the front shell and the rear shell. Reference numeral 5 denotes a buckle supporting shaft, which is the center of a buckle turn. Further, the front shell and the rear shell each have components and parts in accordance with the function. Reference numeral 6 denotes a glass portion of a lens barrel, and a subject image passes the glass portion to be guided to an image pickup optical system lens of the digital camera stored in the housing. Reference numeral 8 denotes a glass pressing member, which is arranged at a leading end of the lens barrel portion, and which clamps and fixes the glass portion of the lens barrel together with the front shell. Reference numeral 11 denotes the lens barrel portion, which corresponds to a lens barrel of the stored digital camera, and which is a convex portion that covers the lens barrel portion of the camera. Reference numeral 12 denotes front surface operation members, which correspond to front surface operation portions of the stored digital camera, and which are operated to make the camera conduct a desirable operation.

Here, the front shell is a transparent member. Thus, a user can confirm, even from the outside of the housing, display (for example, printing, and type character) for indicating functions of the respective operation portions. Reference numeral 13 denotes a stroboscopic portion, which corresponds to a stroboscopic portion of the stored digital camera. As described above, since the front shell is transparent, a light flux for illuminating a subject is irradiated to the outside of the housing without being disturbed.

Reference numeral 21 denotes rear surface operation members, which correspond to rear surface operation portions of the stored digital camera, and which are operated to make the camera conduct a desirable operation. Incidentally, the operation portions may include not only a press button but also a dial and the like. The rear shell is transparent similarly to the front shell. Thus, the user can confirm, even from the outside of the housing, the display (for example, printing, and type character) for indicating functions of the respective operation portions. Further, a general digital camera is provided with a display means on its back surface with, for example, the purpose of confirming a subject at the time of photography, the purpose of reconfirming a photographed image, and the purpose of reproducing a recorded image. At this time, there is a large merit that the display means can be confirmed without the use of new mechanisms and components since both the shells are transparent.

Subsequently, description will be made of an operation in the case where the digital camera is received in the housing. First, the buckle is turned around the buckle supporting shaft to release the fixation of the shells. Then, the shells are made to turn around the shell supporting shaft to expose a digital camera receiving space.

The digital camera is received in the exposed receiving space by a predetermined method. Then, the front shell and the rear shell are connected with each other to be again fixed by the buckle. After the reception, all (or necessary) operation portions of the digital camera can be operated from the outside through the operation portions provided in the housing, and thus, imaging of a subject is possible through the glass portion of the lens barrel. Further, the stroboscopic means and the display means can be used by using the transparent shells. That is, a water-proof/dust-proof function can be added to an image pickup device through the simple operation described above.

Now, stroboscopic photography of a single digital camera is considered. The single digital camera meets product specifications, of course.

Next, stroboscopic photography for the case where the camera is received in the housing is considered. Attention needs to be paid on a fact that the size of the lens barrel portion changes. Since the lens barrel portion of the front shell covers the exterior of the lens barrel portion of the digital camera, it is undeniable that the lens barrel portion in the case of the housing that receives therein the camera is larger in size than that of the single digital camera. Originally, attention needs to be paid on the lens barrel portion in order that the portion does not disturb the light flux of illumination light since the lens barrel portion is positioned before the stroboscope emitting portion (on the subject side). In consideration of the above, the positions of the lens barrel and the stroboscope on the main body side need to be determined.

However, in the case of accessories such as various housings, a part of illumination light of the camera is disturbed by the lens barrel of the housing, and particularly, the light may not reach a part of a screen with which stroboscopic photography is performed in short-range photography. This indicates a state of, what is called, "shading".

In this case, a diffusion plate having a function of diffusing a light flux is used. The diffusion plate is arranged and fixed in front of the stroboscopic portion of the housing, and the light flux before the diffusion plate is diffused, thereby making light reach a dark portion. At this time, a large effect cannot be expected even if light is diffused before the glass pressing member because the member makes a shadow. It is desirable that the setting position of the diffusion plate is close to the subject and is beyond the position of the glass pressing member at the cutting edge if possible.

However, an adverse effect that arises from the use of the diffusion plate is not considered in the conventional example. Resultingly, the range of light becomes shorter as the light diffuses more since the stroboscope emission amount on the camera side does not change. That is, the use of the diffusion plate prevents the strobe light from covering the range that is covered in stroboscopic photography of the single digital camera. Thus, the subject cannot be illuminated at long range.

SUMMARY OF THE INVENTION

The present invention has been made in view of the above, and therefore has an object, in a housing having a means of diffusing a projected light flux, to enable attachment and detachment of the diffusion means in a state in which an image pickup device is received in the housing and to improve performance and operability in the housing.

The housing apparatus according to the present invention is a housing that receives an image pickup device provided with a light projecting means. The housing apparatus includes a diffusing means of diffusing a projected light flux of the light projecting means, and has a structure in which the diffusing means can be detachably attached from the housing in a state in which the image pickup device is received.

Further, the diffusion plate has an engaging portion. A guide portion for guiding the diffusion plate is formed in a receiving portion. The guide portion is provided with a diffusion plate engaging portion that is engaged with the engaging portion.

Further, the housing apparatus includes a connection member that connects the diffusion plate and the housing main body.

BRIEF DESCRIPTION OF THE DRAWINGS

FIG. 7 is a diagram of another embodiment of a housing apparatus according to the present invention.

DESCRIPTION OF THE PREFERRED EMBODIMENTS

Figure 1:
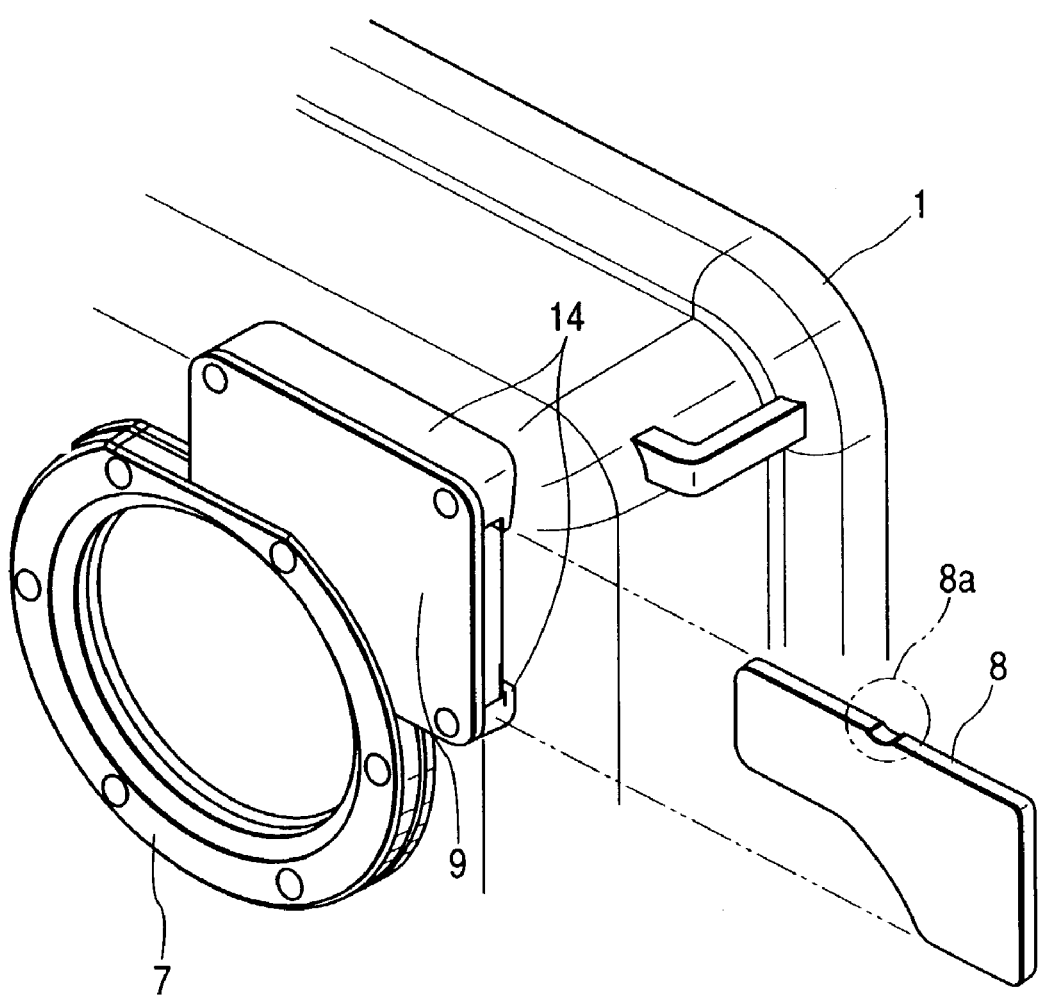
FIG. 1 is a diagram of a main part of a housing apparatus according to the present invention.
Figure 2:
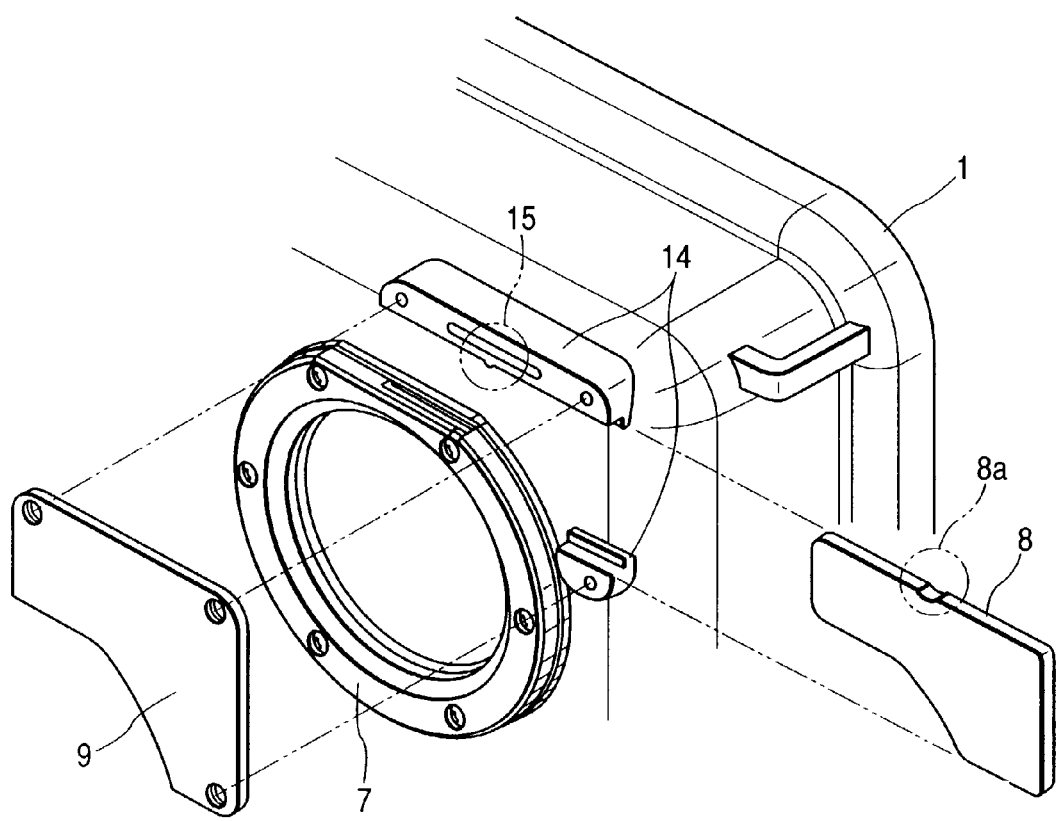
FIG. 2 is an exploded diagram of the housing apparatus according to the present invention.

FIG. 1 is a diagram of a main part of a housing apparatus according to the present invention, and FIG. 2 is an exploded diagram of the housing apparatus according to the present invention.

In these figures, reference numeral 1 denotes a front shell, which covers a front half surface of a digital camera. Reference numeral 14 denotes a diffusion plate guiding portion, which guides a diffusion plate to a predetermined position. Reference numeral 15 denotes a convex-shaped diffusion plate holding portion provided to the guide portion 14, and the holding portion restricts movement of the diffusion plate when the diffusion plate reaches the predetermined position. The holding portion has a shape so as to serve as a spring, and functions as a click.

Reference numeral 7 denotes a glass pressing member, which clamps and fixes a not-shown glass portion of a lens barrel. Reference numeral 8 denotes the diffusion plate, which diffuses strobe light of the digital camera received in the housing to make the strobe light reach the portion that the strobe light generally does not reach. Reference symbol 8a denotes a concave-shaped engaging portion, which is engaged with the convex portion of the diffusion plate holding portion 15. The holding portion 15 is engaged with the engaging portion 8a so that the diffusion plate 8 is held in a stable manner. Reference numeral 9 denotes a protective member, which clamps the diffusion plate together with the diffusion plate guiding portion, and which protects the diffusion plate against impact, damage, and the like.

These figures show a state in which the diffusion plate 8 is not mounted at the predetermined position. When the position where the diffusion plate holding portion 15 of the front shell is engaged with the diffusion plate engaging portion is at the predetermined position, the diffusion plate is held so as not to move improperly.

First, the case where the diffusion plate 8 is at the predetermined position is considered. The diffusion plate 8 is positioned substantially in the vicinity of a tip end of the glass pressing member, and thus, the strobe light diffuses effectively such that the influence of the lens barrel portion is eliminated. In particular, in the case of short-range stroboscopic photography, illumination of the strobe light needs to be performed in a wide range since a photographic angle of view is wide. That is, photography with the use of the diffusion plate is effective in the case of short-range stroboscopic photography. On the other hand, in the case of long-range stroboscopic photography, the strobe light diffuses, and the range of the strobe light is insufficient accordingly.

Next, the case where the diffusion plate is not at the predetermined position is considered. This case provides the opposite state to the above-described state. A sufficient range of the strobe light can be obtained in the case of long-range stroboscopic photography; on the other hand, uniform illumination is difficult to be performed in the case of short-range stroboscopic photography.

Description has been made hereinabove. Then, what is important here is that the diffusion plate, which does not exist or which is fixed in the prior art, can be selectively attachable/detachable in accordance with a photography scene according to the present invention. Further the attachment/detachment can be performed without opening and closing the housing in the state in which the camera is received in the housing. Thus, the operability is further improved. Therefore, the housing can be added with a water-proof/dust-proof function with no damage caused on the potential of the stored digital camera.

Further, according to the present invention, there can be sufficiently utilized a function of promptly confirming a photographed image of a digital camera. In general, a digital camera is provided with a display means for confirming a photographed image. The display means can be confirmed in the present invention.

Now, assumed is a scene in which judgement cannot be made as to which way is effective between use of the diffusion plate and non-use thereof. In this case, photography is performed under both the conditions, the photographed images are reproduced, and then, confirmation and comparison are made between the images under the respective conditions. As a result, the subsequent photographic condition can be determined. The above-described work operation can be promptly performed because there is nothing else that the diffusion plate can be attachable/detachable in the state of reception.

Further, a housing to which the diffusion plate is detachably attachable is proposed among housings with the use of the diffusion plate with other reasons, and thus is described below. Generally, in short-range stroboscopic photography, reflection of strobe light is strong, and thus, a light amount is difficult to be adjusted. Therefore, a housing is given which uses the diffusion plate for the purpose of weakening the strobe light. The housing is generally arranged at the position as close as possible to a stroboscope and on the inner side of the housing (before expansion of a light flux) in order to prevent an increase in size of the member.

As the above-described housing, there is proposed one to which the diffusion plate is detachably attachable. However, a clear line is drawn between the above-described housing and the housing according to the present invention since the purpose of the above-described housing is not "diffusion of a light flux" but "light extinction". Further, the diffusion plate cannot be attachable/detachable without opening the housing. For example, the diffusion plate cannot be attachable/detachable in water. Thus, it must be said that there is a fault in operability of the housing.

Figure 3:
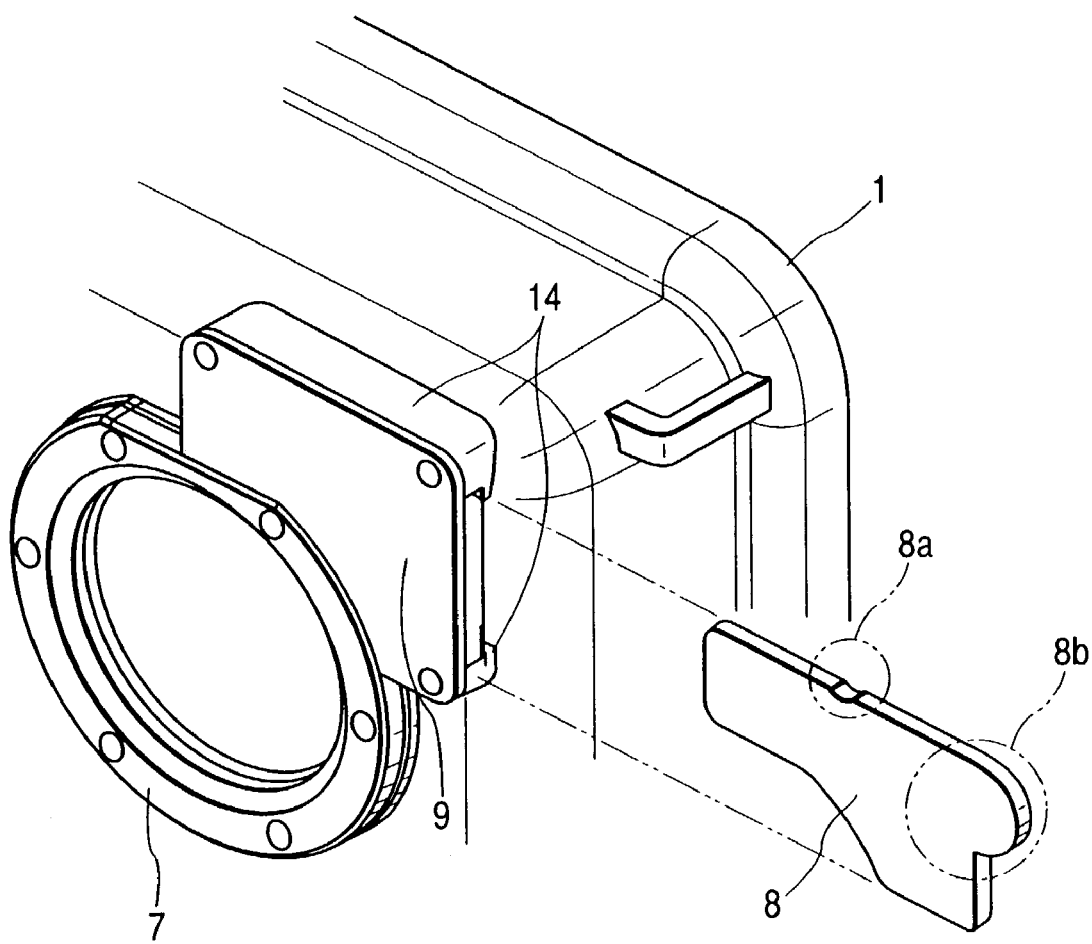
FIG. 3 is a modified diagram of the housing apparatus according to the present invention.
Figure 4:
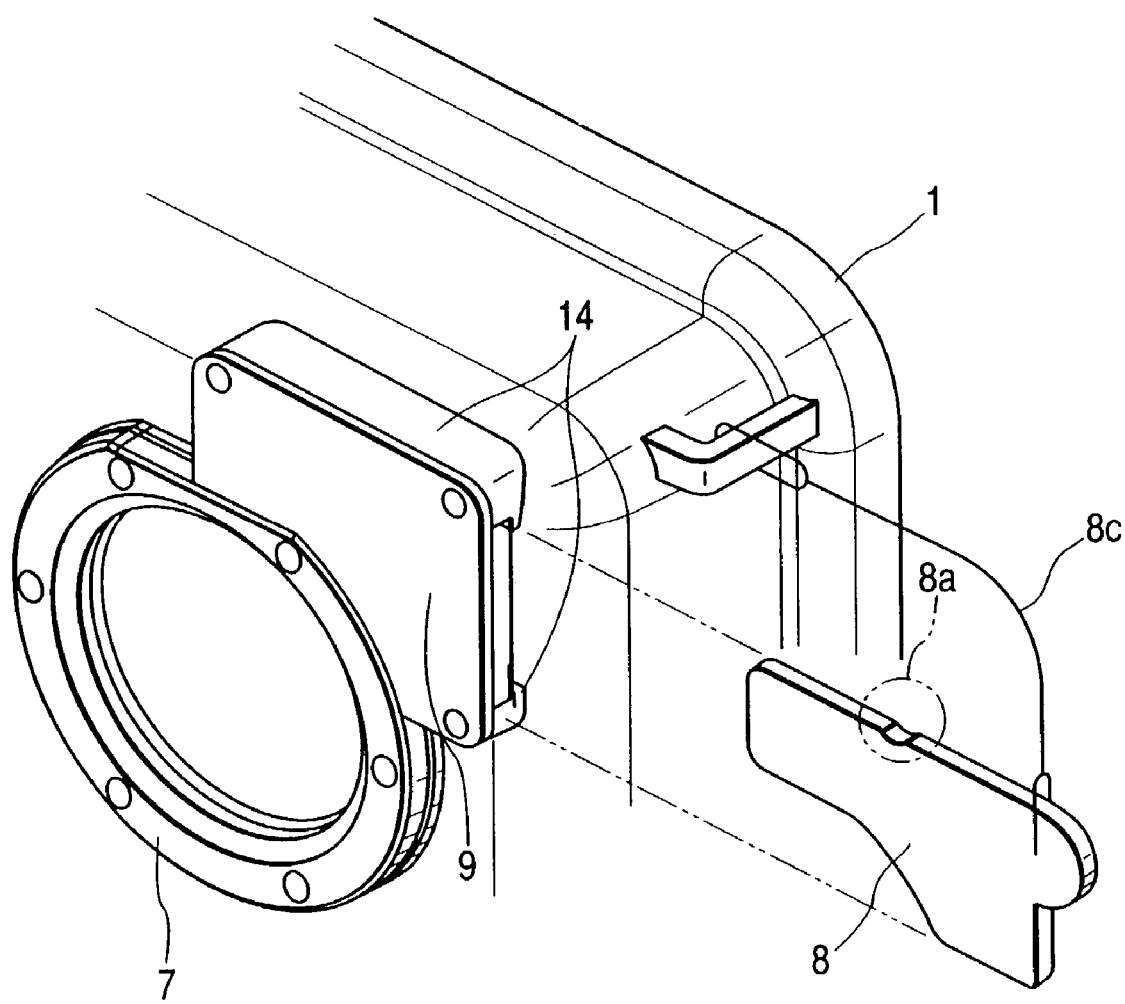
FIG. 4 is a modified diagram of the housing apparatus according to the present invention.
Figure 5:
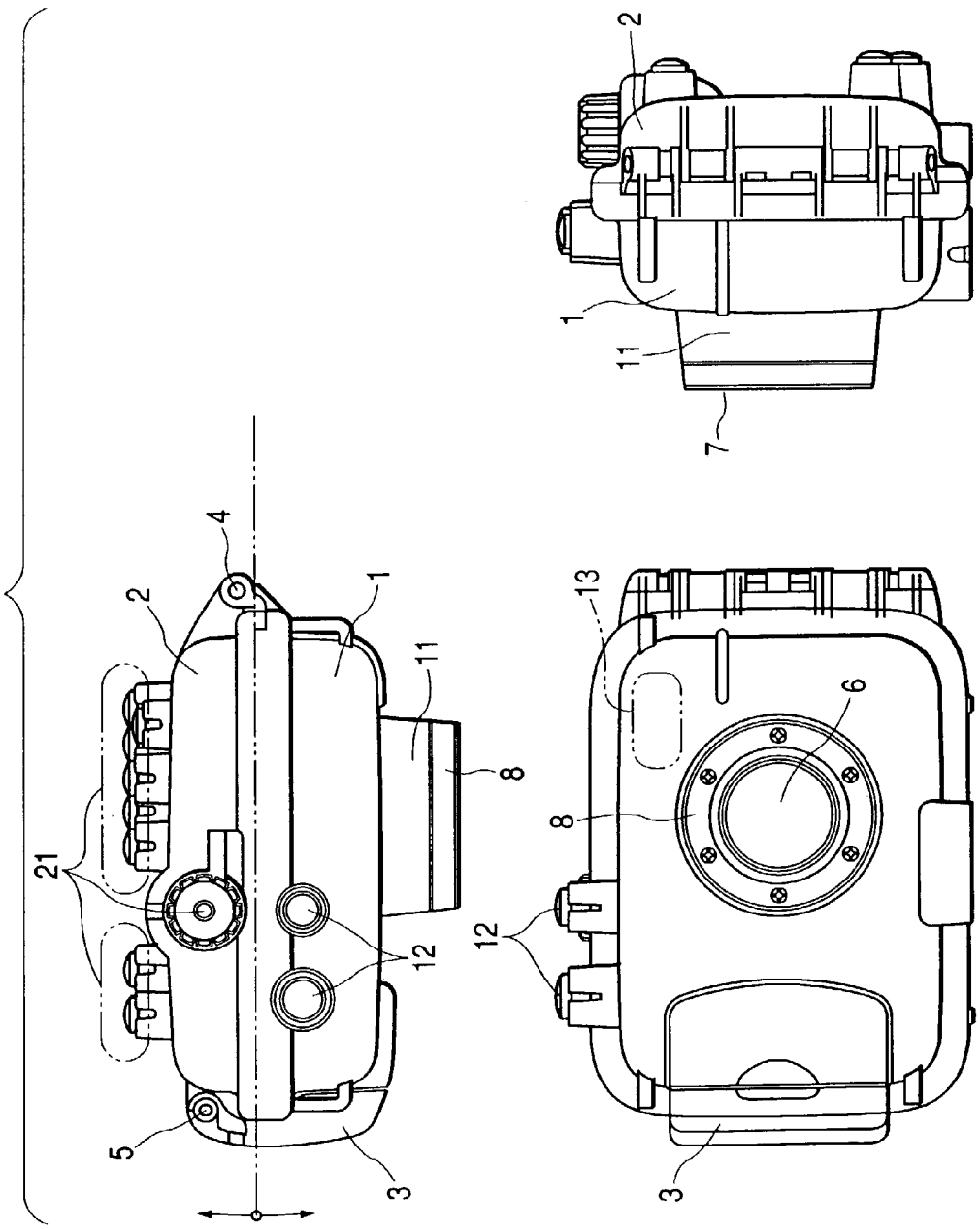
FIG. 5 is a diagram of a conventional water-proof/dust-proof housing.

FIGS. 3 and 4 each are a diagram of the modified housing apparatus according to the present invention.

In the figures, reference symbol 8b denotes a diffusion plate operation portion, which is a part of the diffusion plate. This portion is not held in and protrudes from a back surface of the protective member seen from the front side. Here, assuming the case where the mounted diffusion plate is to be removed, it is sufficient that an operator may pinch the portion to apply a force in a predetermined direction. Basically, the portion does not contribute to an optical effect.

In the case where the diffusion plate operation portion 8b is not provided, the diffusion plate is difficult to be operated (held). Thus, improvement in operability can be further attained by providing the diffusion plate operation member. Reference symbol 8c denotes a connection member, which is a string-like member that connects the diffusion plate with the housing. In this embodiment, the storage of the diffusion plate in photography without the use of the diffusion plate is abandoned to the operator. Thus, there are trouble of receiving and securing the diffusion plate and concern about loss of the diffusion plate. Therefore, the diffusion plate and the housing are connected with each other in advance to reliably secure and not to lose the diffusion plate at the time of the non-use. This can realize further improvement in operability.

Figure 6:
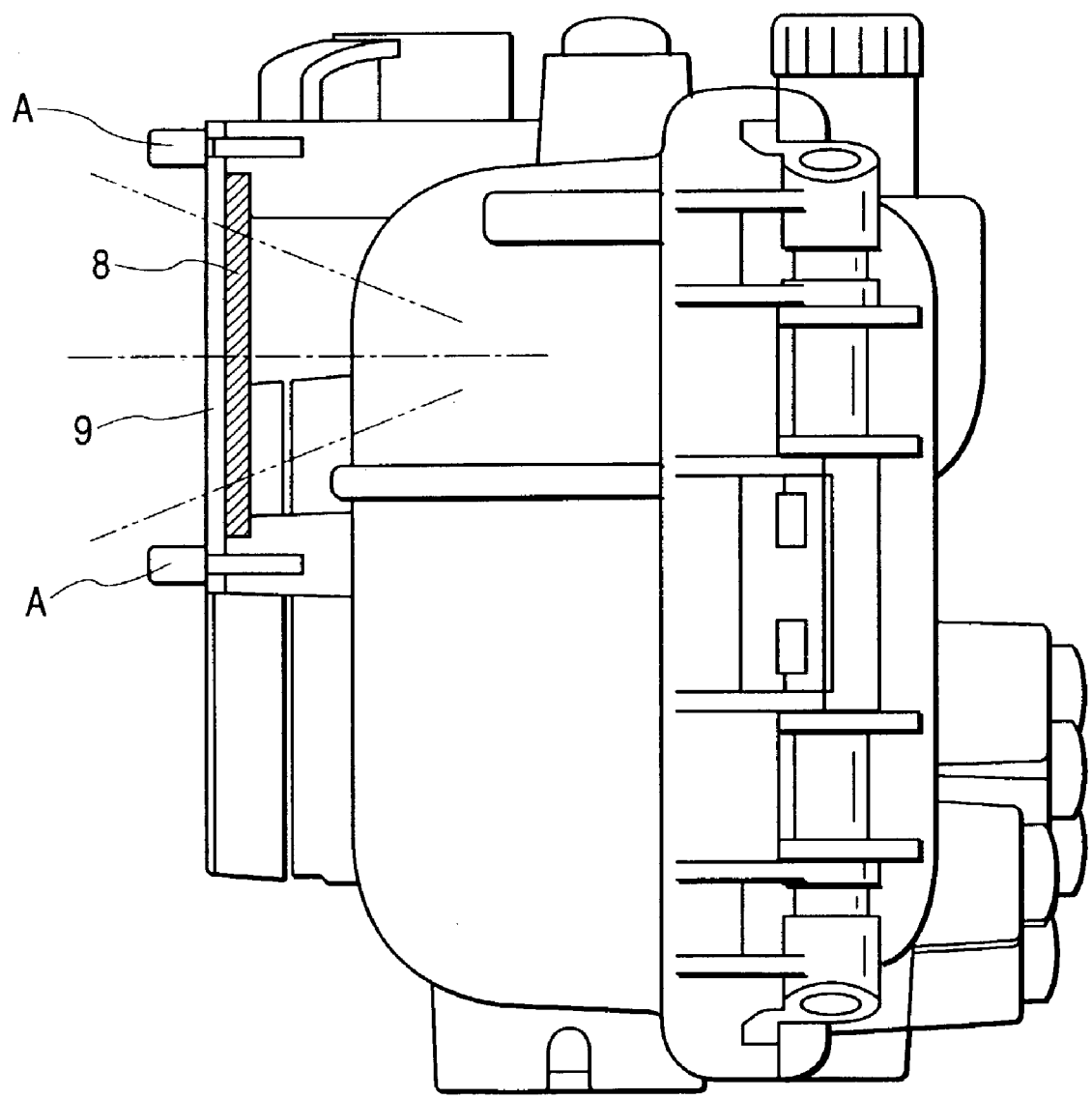
FIG. 6 is a diagram of another embodiment of a housing apparatus according to the present invention.

In the above-described embodiment, there has been described the case where the diffusion plate is slid in a direction perpendicular to a light flux to be attached/detached. However, according to the present invention, the attachment/detachment direction and attachment/detachment method are not limited to those in the embodiment. FIGS. 6 and 7 each show another embodiment of a housing apparatus according to the present invention.

In FIG. 6, reference symbol A denotes a fastening screw, which fastens the protective member to the housing, and fixes the diffusion plate in a space formed by both the members. The fastening screw can be operated manually without using a tool. The fastening of the screw is released to remove the protective member. Thus, the attachment/detachment of the diffusion plate can be performed.

In FIG. 7, reference numeral 16 denotes a protective member holding portion, which is formed by a part of the hosing. The holding portion has on its tip end a locking portion with the protective member, and an arm portion of the holding portion has elasticity. In the case where the diffusion plate is attached/detached, the elastic portion (arm portion) is deformed to release locking between the protective member and the retaining portion. Thus, the diffusion plate is attachable/detachable.

As described above, according to the present invention, the attachment/detachment of the means of diffusing a projected light flux is made possible in the state in which the image pickup device is received in the housing. Thus, the use and non-use of the diffusion means can be selected. Further, the selection can be made without the operation of opening and closing the housing. Accordingly, the function and operability of the apparatus can be improved.

What is claimed is:

1. A housing apparatus for accommodating an image pickup device, comprising:
   a) a diffusion member which diffuses light transmitting therethrough;
   b) a holding portion which attachably/detachably holds the diffusion member and is formed on an external surface of a body of the housing apparatus; and
   c) a protective member which protects an optical effect surface of the diffusion member and in which light diffused the diffusion member is transmitted through the protective member when the diffusion member is held by the holding portion, wherein the protective member is fixed to the holding portion.

2. A housing apparatus according to claim 1, wherein in a condition that the diffusion member is held by the holding portion, a portion exposing from the protective member is formed on the diffusion member.

3. A housing apparatus according to claim 1, wherein the diffusion member is connected to the body of the housing apparatus by a string.

4. A housing apparatus according to claim 1, wherein a concave portion is formed on an exterior of the diffusion member and a convex portion which engages with the concave portion is formed on the holding portion.

* * * * *